(12) United States Patent
Monaco (10) Patent No.: US 12,275,420 B2
(45) Date of Patent: Apr. 15, 2025

(54) SYSTEM AND METHOD FOR MINIMIZING ALIASING IN SAMPLE-BASED ESTIMATORS

(71) Applicant: Mercedes-Benz Group AG, Stuttgart (DE)

(72) Inventor: Christopher Monaco, Sunnyvale, CA (US)

(73) Assignee: Mercedes-Benz Group AG, Stuttgart (DE)

(*) Notice: Subject to any disclaimer, the term of this patent is extended or adjusted under 35 U.S.C. 154(b) by 227 days.

(21) Appl. No.: 18/100,769

(22) Filed: Jan. 24, 2023

(65) Prior Publication Data

US 2024/0246550 A1 Jul. 25, 2024

(51) Int. Cl.
| | |
|---|---|
| *B60W 50/06* | (2006.01) |
| *B60W 10/18* | (2012.01) |
| *B60W 10/20* | (2006.01) |
| *B60W 60/00* | (2020.01) |
| *G01C 21/28* | (2006.01) |
| *G07C 5/02* | (2006.01) |

(52) U.S. Cl.
CPC ............ *B60W 50/06* (2013.01); *B60W 10/18* (2013.01); *B60W 10/20* (2013.01); *B60W 60/001* (2020.02); *G01C 21/28* (2013.01); *G07C 5/02* (2013.01); *B60W 2420/403* (2013.01); *B60W 2420/408* (2024.01); *B60W 2555/20* (2020.02)

(58) Field of Classification Search
CPC .... B60W 50/06; B60W 60/001; B60W 10/18; B60W 10/20; B60W 2555/20; B60W 2420/408; B60W 2420/403; G01C 21/28; G07C 5/02
See application file for complete search history.

(56) References Cited

U.S. PATENT DOCUMENTS

| | | | |
|---|---|---|---|
| 5,815,101 | A | 9/1998 | Fonte |
| 8,788,069 | B2 | 7/2014 | Nixon |
| 8,958,510 | B1 | 2/2015 | Harris |
| 9,759,809 | B2 | 9/2017 | Derenick |
| 9,831,970 | B1 | 11/2017 | Harris |

(Continued)

FOREIGN PATENT DOCUMENTS

| | | |
|---|---|---|
| CN | 103019170 A | 4/2013 |
| CN | 103019170 B | 4/2013 |

(Continued)

OTHER PUBLICATIONS

Steinbring Jannik et al: "Optimal sample-based fusion for distributed state estimation", 2016 19th International Conference on Information Fusion (Fusion), [Online] Jul. 1, 2016 (Jul. 1, 2016), pp. 1600-1607.

(Continued)

*Primary Examiner* — Vivek D Koppikar
*Assistant Examiner* — Jeffrey R Chalhoub
(74) *Attorney, Agent, or Firm* — Mahamedi IP Law LLP (57) ABSTRACT

A system can perform a method that includes receiving sensor data from one or more sensors. The system can execute a sample-based estimator on the sensor data. The sample-based estimator optimizes a probability distribution dilation of the sensor data based on a minimum measurement uncertainty value to minimize aliasing in the sample-based estimator.

15 Claims, 7 Drawing Sheets

(56) References Cited

U.S. PATENT DOCUMENTS

| | | | |
|---|---|---|---|
| 10,027,513 B2 | 7/2018 | Liu | |
| 2013/0079901 A1* | 3/2013 | Blevins | G05B 21/02 |
| | | | 700/71 |
| 2021/0264173 A1* | 8/2021 | Wang | G01S 13/931 |

FOREIGN PATENT DOCUMENTS

| | | |
|---|---|---|
| CN | 112733273 | 4/2021 |
| CN | 109284677 | 6/2022 |
| DE | 102012109132 A1 | 3/2013 |
| GB | 201217064 | 11/2012 |
| GB | 2496718 A1 | 5/2013 |
| GB | 2496718 A2 | 10/2015 |
| JP | 6307215 B2 | 3/2013 |
| JP | 2013073630 A2 | 4/2013 |
| WO | WO 2021/162018 | 8/2021 |

OTHER PUBLICATIONS

Sascha Steyer et al: "Grid-Based Object Tracking With Nonlinear Dynamic State and Shape Estimation", IEEE Transactions on Intelligent Transportation Systems, [Online] Jun. 26, 2019 (Jun. 26, 2019), pp. 1-20.

International Search Report dated Apr. 23, 2024, PCT International Application No. PCT/EP2023/087953 15 pages.

* cited by examiner

SYSTEM AND METHOD FOR MINIMIZING ALIASING IN SAMPLE-BASED ESTIMATORS

BACKGROUND

The use of state estimation modules, such as histogram filters, to estimate certain system states in sensor data can result in aliasing, in which a given set of samples can be extracted from multiple distinct signals. Aliasing can occur when the sampling interval of the state estimation module is too large for the signal. In robotics and/or autonomous vehicle applications, aliasing can result in inaccurate localization and pose estimations, which can create conflicts in perception and motion planning operations of the robots and/or autonomous vehicles.

SUMMARY

Systems, methods, and computer programs products are described for executing a sample-based estimator on sensor data to minimize or eliminate the effects of aliasing. The system can execute the sample-based estimator on the sensor data to optimize a probability distribution dilation of the sensor data based on a minimum measurement uncertainty value that is calculated specifically for minimizing aliasing in the sample-based estimator. In various implementations, the minimum measurement uncertainty value is determined based on an application of the Nyquist-Shannon sampling theorem to the sample-based estimator. As provided herein, the minimum measurement uncertainty value can comprise a minimum measurement uncertainty limit that is calculated based on the application of the Nyquist-Shannon sampling theorem to the sample-based estimator.

According to examples described herein, the sample-based estimator can comprise a histogram filter, a particle filter, or any other non-parametric filter. In various implementations, execution of the sample-based estimator based on the minimum measurement uncertainty value causes dilated measurement probability distributions to propagate to dilated state estimate probability distributions that are minimally susceptible to corrupting effects of aliasing. In certain examples, the sensors can be included in a sensor suite of an autonomous vehicle comprising a set of control mechanisms, and the sensor data can correspond to a sensor view of a surrounding environment of the autonomous vehicle. In further examples, the computing system can autonomously operate the set of control mechanisms of the autonomous vehicle to drive the autonomous vehicle along a road segment based on a state estimate from the sample-based estimator, where set of control mechanisms includes at least a steering system, a braking system, and an acceleration system of the autonomous vehicle.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

As provided herein, "aliasing" in the field of sensor data processing involves an effect where a given set of samples could be conceivably extracted from differing signals. As such, those samples can provide misleading information to a system about the original continuous signal. As an example, an autonomous vehicle with the ability to detect lane markings may determine the continuous probability distribution of the vehicle's pose (i.e., location and orientation) using a sample-based estimator. In doing so, the sample-based estimator may split the vehicle pose state space into different bins, where each bin is represented by a pose estimate sample. The relative likelihoods of each pose estimate sample can be determined by its consistency with the lane marking detections. In all, these samples are designed to capture the vehicle pose estimate's continuous probability distribution. However, in certain scenarios where aliasing is prevalent, the samples' likelihoods can provide misleading or conflicting about the vehicle's pose, which can cause conflicts in the vehicle's route planning and decision making.

Two common methods exist for mitigating the effects of aliasing in sample-based estimators. The first involves decreasing the sampling interval, which increases the number of sampling bins in the sample-based estimator, hence increasing the computational requirements of the computing system. For state spaces that involve three dimensions (e.g., autonomous vehicle environments), the computational requirements can be prohibitively large. Accordingly, increasing the number of sampling bins involves a tradeoff between decreasing the risks or effects of aliasing versus restraining the computation cost. Another common method to decrease the sampling interval is to decrease the sampled search space instead. However, this comes with a high risk of missing the true solution altogether.

The second method of mitigating the effects of aliasing involves dilating the state estimate probability distribution, which effectively spreads out the probability distribution by introducing measurement uncertainty into the sensor data. While this method does not substantially require additional computational resources, the method can result in crucial data loss in which valuable information is purposefully discarded. Accordingly, the use of probability distribution dilation in sample-based estimators involves a tradeoff between decreasing the risks or effects of aliasing versus discarding valuable information in the sensor data.

A computing system is described herein that optimizes probability distribution dilation in sample-based estimators by using a calculated minimum measurement uncertainty value to introduce measurement uncertainty into the sample-based estimator. As provided herein, the minimum measurement uncertainty value for the sample-state estimator (e.g., a histogram filter) can be calculated using the Nyquist-Shannon sampling theorem, which has been traditionally applied to continuous sinusoidal signals for reducing or eliminating aliasing (e.g., in analog-to-digital converters). Accordingly, the sample-based estimator can introduce an optimal level of uncertainty into the sensor data measurements based on the calculated minimum measurement uncertainty value to optimize the probability distribution dilation in the sample-based estimator, thereby minimizing aliasing and the discarding of valuable information in the sensor data.

As provided herein, a "network" or "one or more networks" can comprise any type of network or combination of networks that allows for communication between devices. In an embodiment, the network may include one or more of a local area network, wide area network, the Internet, secure network, cellular network, mesh network, peer-to-peer communication link or some combination thereof and may include any number of wired or wireless links. Communication over the network(s) may be accomplished, for instance, via a network interface using any type of protocol, protection scheme, encoding, format, packaging, etc.

As further provided herein, an "autonomy map" or "autonomous driving map" comprises a ground truth map recorded by a mapping vehicle using various sensors (e.g., LIDAR sensors and/or a suite of cameras or other imaging devices) and labeled to indicate traffic and/or right-of-way rules at any given location. For example, a given autonomy map can be human-labeled based on observed traffic signage, traffic signals, and lane markings in the ground truth map. In further examples, reference points or other points of interest may be further labeled on the autonomy map for additional assistance to the autonomous vehicle. Autonomous vehicles or self-driving vehicles may then utilize the labeled autonomy maps to perform localization, pose, change detection, and various other operations required for autonomous driving on public roads. For example, an autonomous vehicle can reference an autonomy map for determining the traffic rules (e.g., speed limit) at the vehicle's current location, and can dynamically compare live sensor data from an on-board sensor suite with a corresponding autonomy map to safely navigate along a current route.

Among other benefits, the examples described herein achieve a technical effect of minimizing or eliminating aliasing in probabilistic state estimation using sample-based estimators, such as histogram filters and particle filters. Minimization or elimination of aliasing can significantly increase, for example, localization and pose estimation accuracy. As a technical improvement in the field of autonomous vehicle operation, the optimization of probability distribution dilation in sample-based estimators can reduce the possibility of misleading estimates for autonomous vehicles (i.e., estimates that are inaccurate or that differ from reality).

One or more examples described herein provide that methods, techniques, and actions performed by a computing device are performed programmatically, or as a computer implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers and/or personal computers using network equipment (e.g., routers). Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of non-transitory computer-readable mediums include permanent memory storage devices, such as hard drives on personal computers or servers. Other examples of computer storage mediums include portable storage units, such as flash memory or magnetic memory. Computers, terminals, network-enabled devices are all examples of machines and devices that utilize processors, memory, and instructions stored on computer-readable mediums. Additionally, examples may be implemented in the form of computer-programs, or a computer usable carrier medium capable of carrying such a program.

Example Computing System

Figure 1:
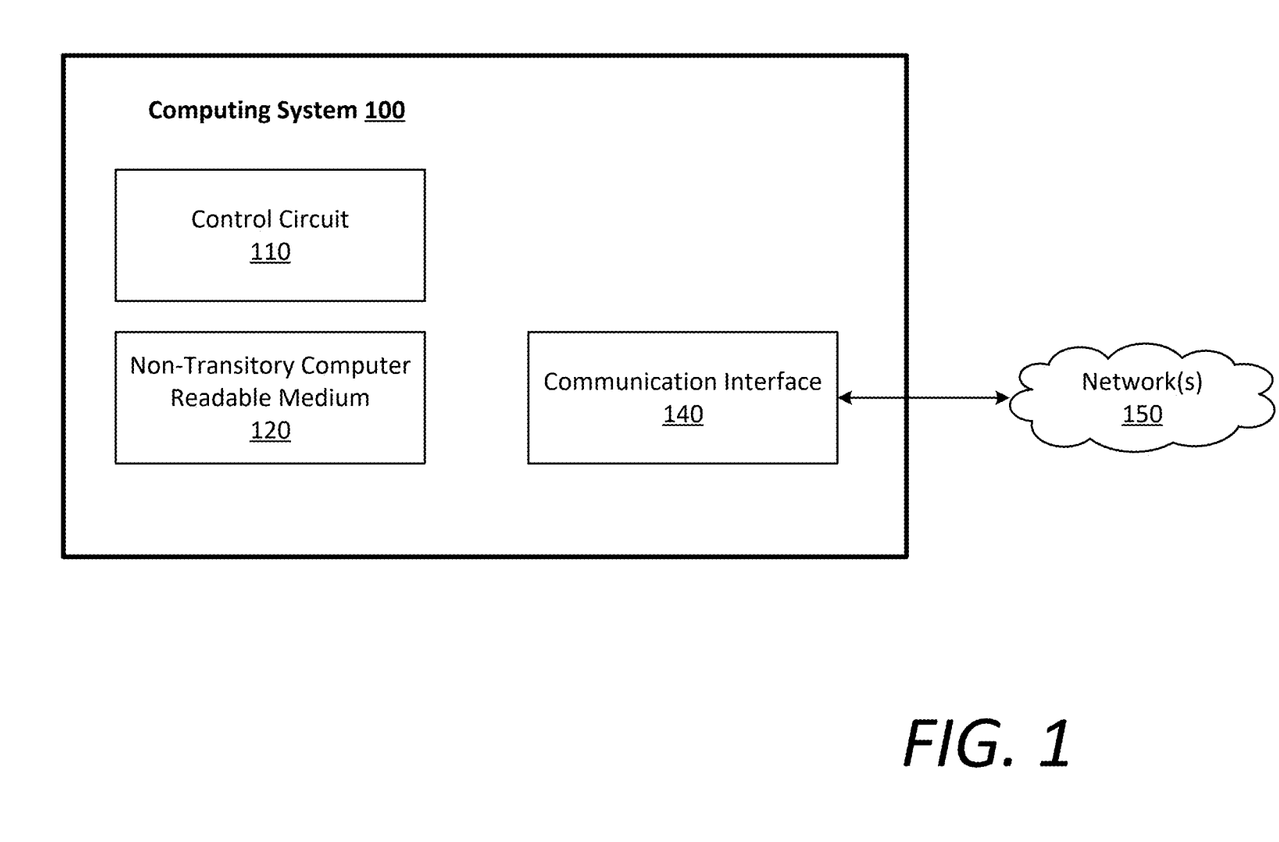
FIG. 1 is a block diagram depicting an example computing system implementing a sample-based estimator that minimizes aliasing, according to examples described herein.

FIG. 1 is a block diagram depicting an example computing system 100 implementing a sample-based estimator that minimizes aliasing, according to examples described herein. In an embodiment, the computing system 100 can include a control circuit 110 that may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 110 and/or computing system 100 may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a central exterior & interior controller (CEIC), a zone controller, or any other controller (the term "or" is used herein interchangeably with "and/or").

In an embodiment, the control circuit 110 may be programmed by one or more computer-readable or computer-executable instructions stored on the non-transitory computer-readable medium 120. The non-transitory computer-readable medium 120 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 120 may form, e.g., a computer diskette, a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick. In some cases, the non-transitory computer-readable medium 120 may store computer-executable instructions or computer-readable instructions, such as instructions to perform the below methods described in connection with of FIGS. 5 and 6.

In various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 110 to perform one or more functional tasks. The modules and computer-readable/executable instructions may be described as performing various operations or tasks when a control circuit 110 or other hardware component is executing the modules or computer-readable instructions.

In further embodiments, the computing system 100 can include a communication interface 140 that enables communications over one or more networks 150 to transmit and receive data. The communication interface 140 may be used to communicate with one or more other systems. The communication interface 140 may include any circuits, components, software, etc. for communicating via one or more networks 150 (e.g., a local area network, wide area network, the Internet, secure network, cellular network, mesh network, and/or peer-to-peer communication link). In some implementations, the communication interface 140 may include for example, one or more of a communications controller, receiver, transceiver, transmitter, port, conductors, software and/or hardware for communicating data/information.

As an example embodiment, the computing system 100 can communicate, over the one or more networks, with a backend computing system using the communication interface 140 to receive an optimally calculated minimum measurement uncertainty value to optimize a probability distribution dilation of a sample-based estimator. This optimization can effectively minimize aliasing in sample estimations, and can be used for internal states in the sample-based estimator as well as external surrounding environments (e.g., robot environments, road network environments for autonomous vehicle operation, etc.)

System Description

Figure 2:
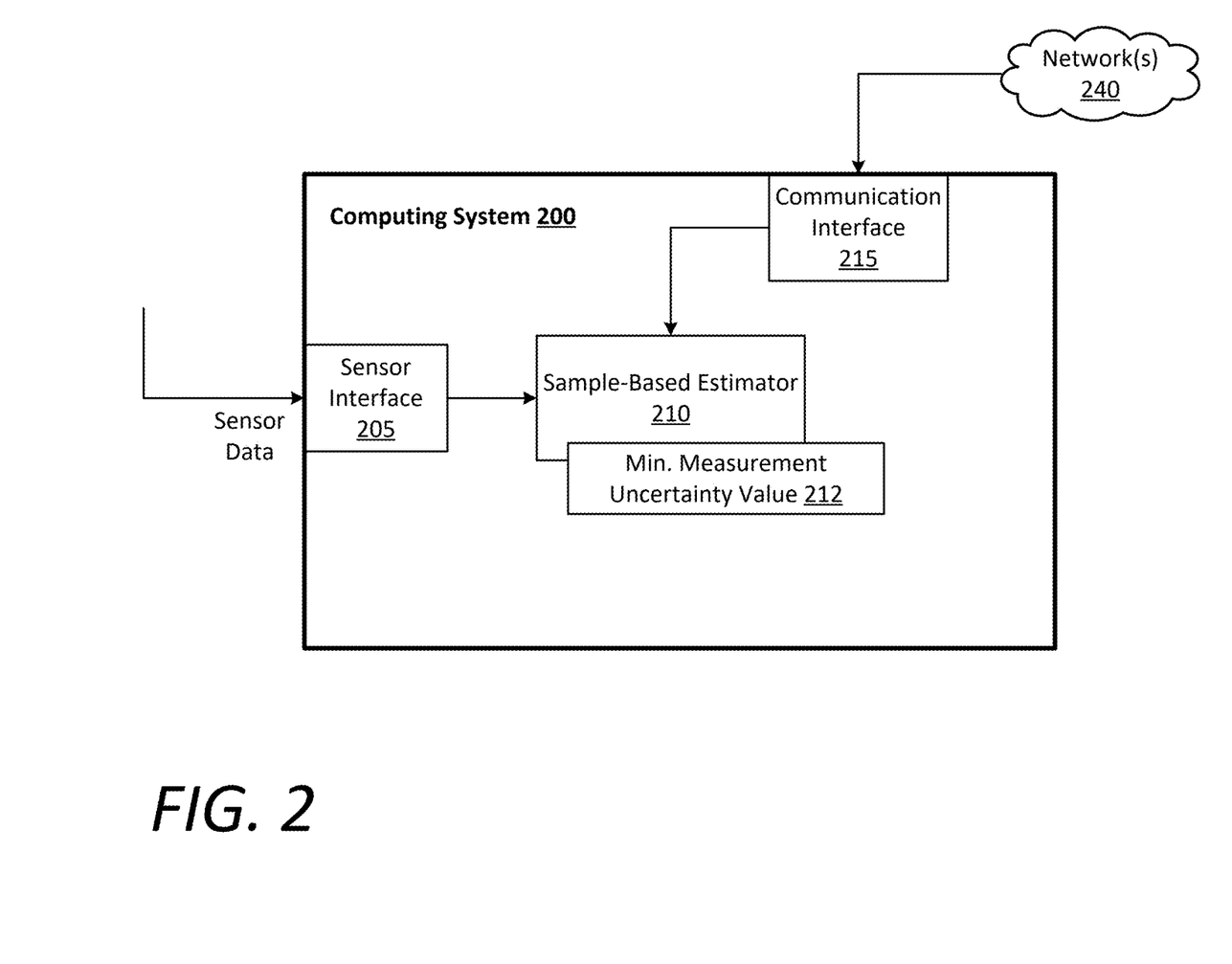
FIG. 2 is a block diagram illustrating an example computing system including a sample-based estimator that utilizes a minimum measurement uncertainty value for optimizing probability distribution dilation of sensor data, according to examples described herein.

FIG. 2 is a block diagram illustrating an example computing system 200 including a sample-based estimator 210 that utilizes a minimum measurement uncertainty value 212 for optimizing probability distribution dilation of sensor data, according to examples described herein. In the below description of FIG. 2, an example of the calculation of the minimum measurement uncertainty value 212 is provided using the Nyquist-Shannon sampling theorem. However, other methods of determining the minimum measurement uncertainty value 212 are contemplated, and can include methods of tuning based on testing and historical results, other mathematical methods, and/or other real-world tuning methods. Thus, embodiments described herein are not limited to the determination of the minimum measurement uncertainty value 212 for the purpose of optimizing probability distribution dilation in manner described below.

In certain examples, the computing system 200 can include a sensor interface 205 that receives sensor data from one or more sensors, such as image sensors (e.g., cameras), LIDAR sensors, radar sensors, infrared sensors, and the like. Additionally or alternatively, the sensor interface 205 can receive other data for implementing the aliasing minimization techniques described throughout the present disclosure, such as images and other digital reconstructions.

The computing system 200 can include a sample-based estimator 210 that utilizes a minimum measurement uncertainty value 212 to optimize a probability distribution dilation of the sensor data to minimize aliasing in the sample-based estimator 210. In certain examples, the sample-based estimator 210 perform the calculation of the minimum measurement uncertainty value 212 internally, or can receive the minimum measurement uncertainty value 212 from an external computing system via a communication interface 215 that enables the computing system 200 to communicate over one or more networks 240.

The determination of the minimum measurement uncertainty value 212 can involve the application of the Nyquist-Shannon sampling theorem to the sample-based estimator 210. The Nyquist-Shannon sampling theorem effectively defines which continuous signals can be reconstructed perfectly, or near perfectly, from a given sample rate-which provides a sufficient condition to avoid aliasing. The system initially calculates the minimum period of the continuous state estimate probability distribution function that permits perfect reconstruction from the sample-based estimator's sampling interval. While the Nyquist-Shannon sampling theorem is often applied to continuous sinusoidal signals, example described herein applies the theorem to sample-based estimators, such as histogram filters.

For continuous sinusoidal signals, the Nyquist-Shannon sampling theorem states that a continuous signal can be perfectly reconstructed for bandlimit $B<f_s/2$ where $f_s$ is the given sample rate. This theorem can also be expressed as $B<1/(2T_s)$ where $T_s$ is the sampling interval and is defined as $T_s=1/f_s$. Typically, B, $f_s$, and $T_s$ refer to the time function domain, where B is measured in hertz (i.e., cycles per second), $f_s$ is measured in samples per second, and T is measured in seconds per sample. However, for other function domains, B can be measured in cycles per unit, $f_s$ can be measured in samples per unit, and $T_s$ can be measured in units per sample.

To apply the Nyquist-Shannon sampling theorem to sample-based estimators, such as histogram filters and particle filters, if $x_i$ is the $i^{th}$ state in the state estimate vector $\vec{x}$, $T_{s,x_i}$ is the histogram's sampling interval for $x_i$, and $B_{x_i}$ is the bandlimit of the histogram's continuous state estimate probability distribution for $x_i$, combined, the relevant equation is:

$$B_{x_i} < 1/(2T_{s,x_i})$$

where $T_{s,x_i}$ is often a set histogram filter input parameter. This can be equivalently represented as:

$$f_{max,x_i} = 1/(2T_{s,x_i}) - \epsilon$$

where $f_{max}$ is the maximum permissible frequency of the continuous state estimate probability distribution function and $\epsilon$ is an arbitrarily small number. Since the relationship between a signal's frequency f and period T is f=1/T, the relationship between a signal's maximum frequency and minimum period is $f_{max}=1/T_{min}$, combining the equations above yields:

$$1/T_{min,x_i} = 1/(2T_{s,x_i}) - \epsilon$$

which can be rearranged and simplified to:

$$T_{min,x_i} = 2T_{s,x_i} + \epsilon$$

where scalar factors of $\epsilon$ are replaced with $\epsilon$ since $\epsilon$ is just an arbitrarily small number.

In all, this equation simply states that the minimum period of a histogram's continuous state estimate probability distribution function must be more than twice as large as the state's sampling interval to avoid aliasing. The minimum state estimate uncertainty can be defined by generating a probability density function that "best fits" within the calculated minimum period. A probability density function may be considered a "best fit" if it satisfies two (often competing) criteria; (i) a prediction interval equal to the minimum period corresponds to a high probability that a random sample will fall within that interval; and (ii) there are almost no regions of near-zero probability densities within the minimum period (e.g., the interval does not contain the long tails of a distribution).

The exact quantitative criteria may be a design choice and implementation specific because many probability density functions extend continuously from negative to positive infinity. Thus, a relatively arbitrary cutoff must be defined somewhere. Effectively, this state estimate probability density function represents the minimum limit of the state estimate uncertainty to prevent sample likelihood aliasing. This can apply to each mode of a multimodal function or to the single pulse of unimodal function. For example, if a histogram filter's state estimate probability density function is expected to be a multimodal Gaussian function, the function can be expected to be a locally unimodal Gaussian within the calculated minimum period. Thus, it can be defined as:

$$T_{min,x_i} = \pm n\sigma_{min,x_i}$$

where $\sigma_{min,x_i}$ represents the state estimate's minimum standard deviation and n is an arbitrary standard score parameter. The Gaussian function may be assumed to lie in the center of the calculated minimum period. Since standard deviations extend from both sides of the Gaussian mean, this equation can be stated differently:

$$T_{min,x_i} = 2n\sigma_{min,x_i}$$

Furthermore, it can be rearranged to calculate the state estimate's minimum standard deviation:

$$\sigma_{min,x_i} = T_{min,x_i}/2n$$

As an example, a suitable design choice for Gaussian functions may be n=2 because this corresponds to a prediction interval with a 95% confidence.

Using the measurement model, the minimum state estimate uncertainties can be propagated into minimum measurement uncertainties. For example, if the state estimate and measurement probability distributions are both expected to be locally Gaussian, their probability density functions can be represented by their respective covariance matrices.

If $\Sigma_{\vec{x}}$ is the covariance matrix for the state estimate vector $\vec{x}$, $\Sigma_{\vec{z}}$ is the covariance matrix for the measurement vector $\vec{z}$, and $H(\vec{x})$ is the measurement model that calculates the expected measurement $\hat{\vec{z}}$ as a function of $\vec{x}$, then the uncertainty can be propagated by the following equation using the partial derivatives of the measurement model:

$$\Sigma_{\vec{z}} = \frac{\partial H(\vec{x})}{\partial \vec{x}} \Sigma_{\vec{x}} \left(\frac{\partial H(\vec{x})}{\partial \vec{x}}\right)^T$$

In this equation, the square root of the diagonal of the covariance matrix yields the vector of the standard deviations. Thus, for Gaussian distributions, this process propagates the state estimate's minimum standard deviations, $\sigma_{min,x_i}$, to corresponding minimum measurement standard deviations, $\sigma_{min,z_j}$.

When calculating the sample likelihoods, the measurement uncertainties can be saturated so that they cannot fall below their calculated minimums. For example, if the state estimate and measurement probability distributions are both expected to be locally Gaussian, their uncertainties are represented by their respective standard deviations. Thus, if a given measurement standard deviation is $\sigma_{z_j}$ and the calculated minimum is $\sigma_{min,z_j}$, the following equation can be used for each measurement state before calculating the sample likelihoods:

$$\sigma_{z_j} = \max(\sigma_{z_j}, \sigma_{min,z_j})$$

Effectively, this dilates the measurement probability distributions, but only to the extent that is necessary to reduce the risk of aliasing.

The uncertainty propagation function's sensitivity to different histogram bin samples is specific to the measurement model. This sensitivity determines whether the same function can be applied to all histogram bin samples or if the function is specific for each histogram bin sample. For example, a vehicle's positional uncertainty should propagate to the indistinguishable Global Navigation Satellite System (GNSS) latitude uncertainties for all estimates within the length of the vehicle. For this measurement, the same uncertainty propagation function can be applied for all histogram bin samples. Consequently, $\sigma_{min,z_j}$ can be calculated and used for all samples.

Conversely, a vehicle's positional uncertainty could propagate to a wide range of camera image pixel uncertainties depending on the sample's distance to a visual landmark. Thus, for this measurement, the uncertainties should be propagated differently for each sample. To do so, $\sigma_{min,z_j}$ can be calculated and stored for several boundary samples or all samples before calculating the sample likelihoods. Then, the maximum of these values would yield a $\sigma_{min,z_j}$ value that is sufficient for all samples. Finally, this universal value should be used to calculate the sample likelihoods.

Accordingly, in the example shown in FIG. 2, the sample-based estimator 210 can apply the minimum measure state uncertainty value 212, as calculated in the manner described above, to the sensor data in order to optimize measurement probability distribution dilation to minimize aliasing. As described herein, this optimization can effectively minimize aliasing in sample estimations, and can be used for internal states in the sample-based estimator 210 as well as external surrounding environments (e.g., robot environments, road network environments for autonomous vehicle operation, etc.).

Example Vehicle Control System

Figure 3:
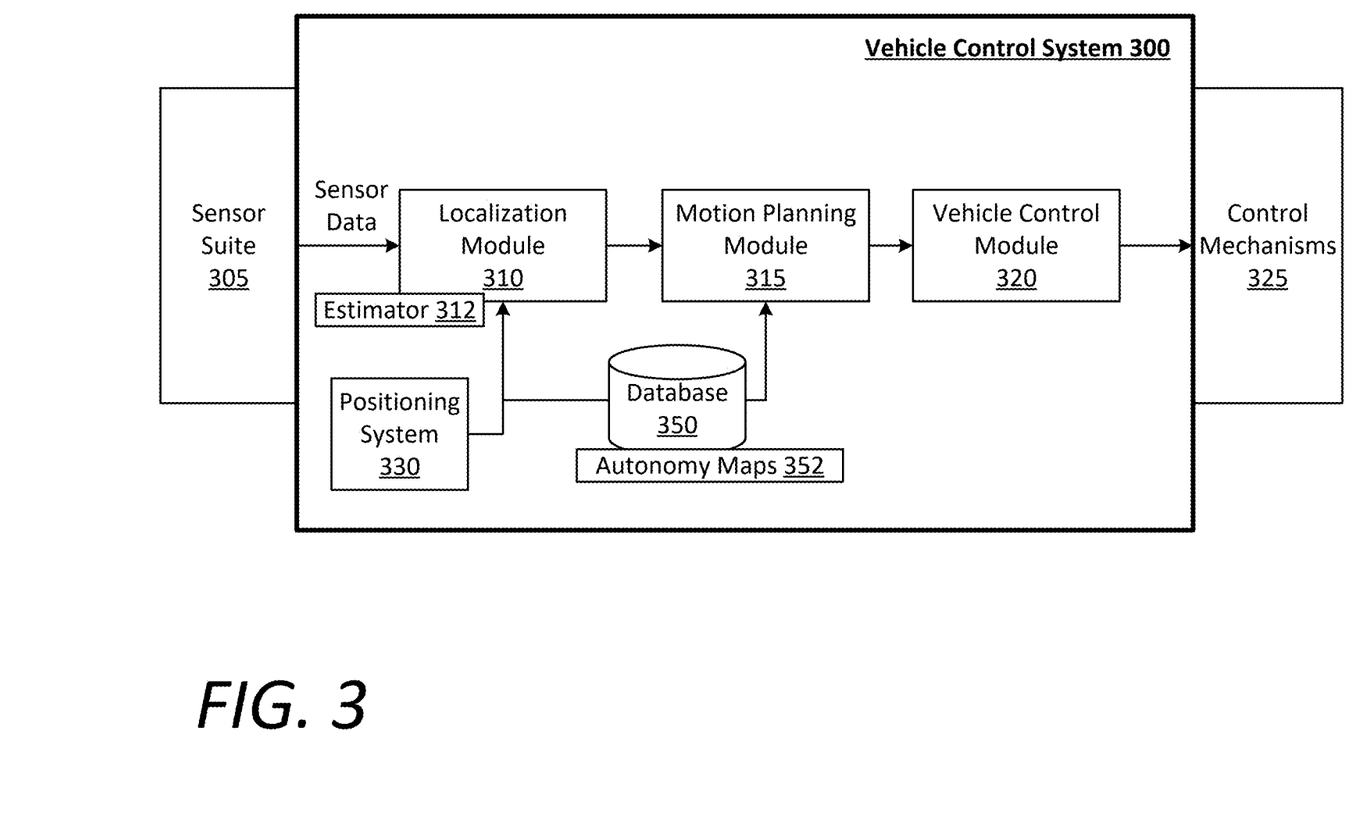
FIG. 3 depicts an example vehicle control system implementing a sample-based estimator in accordance with examples described herein.

FIG. 3 depicts an example vehicle control system 300 implementing a sample-based estimator 312 in accordance with examples described herein. In various examples, the vehicle control system 300 can be implemented as a component of an autonomous or semi-autonomous vehicle, which can include a sensor suite 305 comprising any number and type of sensor, such as LIDAR sensors, radar sensors, cameras or other image sensors, infrared sensors, and the like. The autonomous or semi-autonomous vehicle may further include a set of control mechanisms 325, such as a braking system, acceleration system, steering system, and lights and/or auxiliary systems.

In further examples, the vehicle control system 300 can include a database 350 storing a set of autonomy maps 352 utilized by autonomous and/or semi-autonomous vehicles for operating throughout a region. Specifically, the autonomy maps 352 can be created based on mapping vehicles that generate map data using a sensor suite (e.g., including LIDAR sensors, image sensors, etc.) as the mapping vehicles travel through a road network on which autonomous vehicles operate. The map data may be appended with one or more layers of labeled data that indicate the specified traffic rules (e.g., speed limits, signage, yield zones, crosswalk information, traffic signals, etc.) for any given road segment and/or intersection. The autonomous and/or semi-autonomous vehicles can continuously compare real-time sensor data generated by the on-board sensor suite 305 with the relevant autonomy maps 352 to perform localization, pose, and object classification processes that assist the vehicle in operating safely through the road network.

In various implementations, the vehicle control system 300 can include a localization module 310 that can perform perception, localization, and pose operations to continuously determine the vehicle's position relative to an external reference frame (e.g., a global reference frame of a road network map), and the vehicle's orientation. In doing so, the localization module 310 can receive sensor data from the sensor suite 305 and implement one or more a sample-based estimators 312 (e.g., a histogram filter) to sample the sensor data, and utilize (i) the sensor data, (ii) positioning information from a positioning system 330 (e.g., a GPA or other GNSS module of the vehicle), and (iii) a relevant autonomy map 352 that includes the road segment upon which the vehicle current traverses, in order to perform continuous localization and pose operations.

As described herein, if misleading information exists in any of the positioning information from the positioning system 330, autonomy map 352 (e.g., incorrectly labeled rules), or the sensor data as processed by the sample-based estimator 312 of the localization module 310, the vehicle control system 300 may be forced to enter a conflict state or a stuck state, in which the vehicle control system 300 cannot proceed safely. Assuming no conflicts exist, the localization and pose estimates dynamically determined by the localization module 310 are provided to a motion planning module 315 that can continuously generate an immediate motion plan for the vehicle. This can include upcoming lane changes, lane selections, turning plans, etc. based on an overall route plan to a destination.

The sequence of motion plans generated by the motion planning module 315 can be provided to a vehicle control module 320, which operates the control mechanisms 325 of the vehicle in accordance with the sequence of motion plans to progress the vehicle along the overall route to the destination. In doing so, the vehicle control module 320 can autonomously accelerate, brake, coast, steer, and operate vehicle signals (e.g., headlights, directional signals, horn, etc.) along the overall route.

In accordance with examples described herein, the sample-based estimator 312 implemented by the localization module 310 can impart an optimal level of uncertainty into the sensor data measurements, given a particular sampling interval of the sample-based estimator 312. As described herein, this optimal level of uncertainty can be based on a calculated minimum measurement uncertainty value (MMUV), which can correspond to the MMUV 212 as calculated and described with respect to FIG. 2. The MMUV can be utilized by the sample-based estimator 312 to optimize the probability distribution dilation of the sensor data in a manner that minimizes or effectively eliminates aliasing in the sensor data. As further described herein, the MMUV can be determined locally by the localization module 310 based on the sampling interval of the sample-based estimator 312.

It is contemplated that the minimization or elimination of aliasing in the sample-based estimator 312 can result in the significant reduction or elimination of misleading information in the localization module 310, which can further result in the significant reduction or elimination of conflict states or stuck states in autonomous or semi-autonomous vehicle operation. As a technical solution, this can significantly increase robustness of the localization and pose operations performed by the localization module 310, which have the added effect of improve safety in the operations of the motion planning module 315 and the vehicle control module 320.

Graphical Illustrations

Figure 4A:
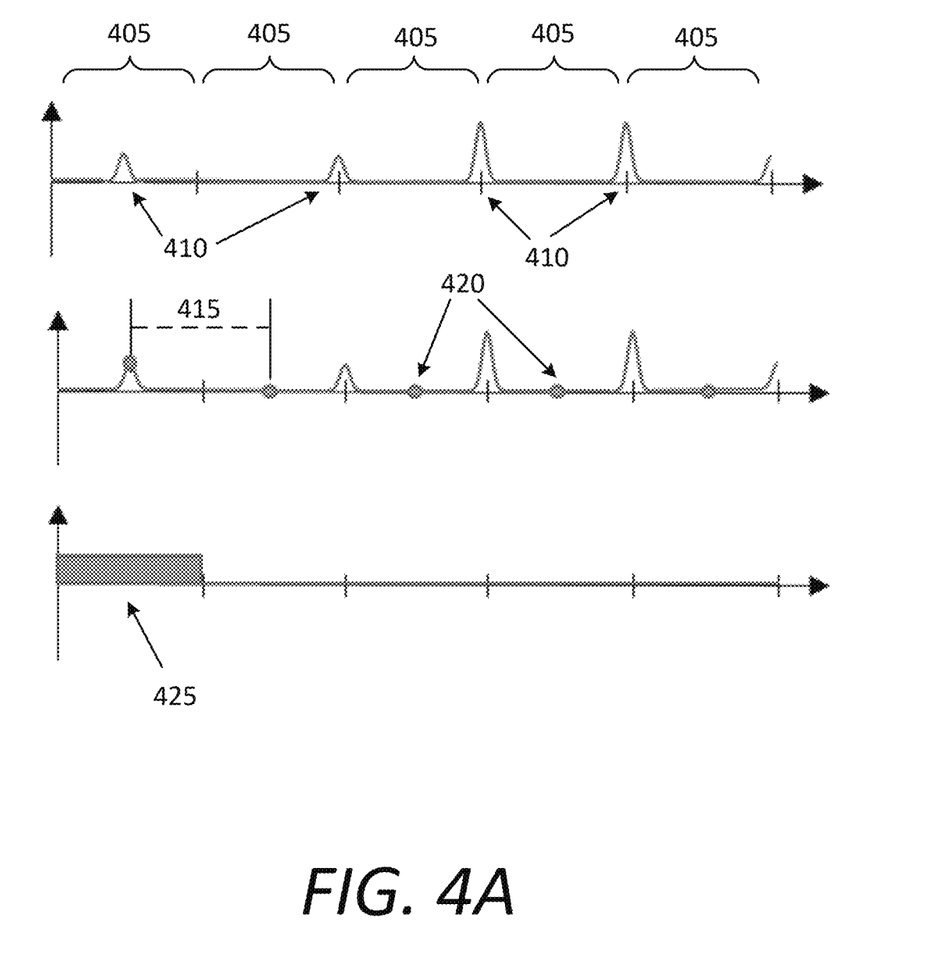
FIG. 4A illustrates example results of a sample-based estimator sampling sensor data, in accordance with examples described herein.

FIG. 4A illustrates example results of a sample-based estimator sampling sensor data when no probability distribution dilation is used, in accordance with examples described herein. As described herein, the sample-based estimator attempts to reconstruct the continuous state estimate probability distribution by sampling different state estimates and comparing their relative likelihoods. In the example of FIG. 4A, the sample-base estimator includes a set of bins 405 represented by a pose estimate hypothesis in its center. A continuous pose estimate probability distribute includes a set of peaks 410 that can indicate useful information for the sample-based estimator. However, due to the sampling interval 415 (or the spacing of the bins 405) the likelihood samples 420 at the pose hypothesis in the center of each bin 405 misses nearly all of the peaks in the continuous probability distribution. The result is a single sampled state estimate likelihood 425 corresponding to the leftmost sample-based estimator bin 405.

As an example illustration, the peak values 410 can correspond to detected lane markings on a multi-laned road segment used for localization and pose estimations by an autonomous vehicle. The resultant sampled state estimate likelihood 425 can provide an inaccurate pose estimation based on the sampled real-time sensor data from the vehicle's sensor suite, which conflicts with information provided by a positioning system and/or autonomous driving map. This can result in a stuck state for the vehicle in which a motion plan cannot be made safely. As a note, if the sample likelihood was solely relied upon for autonomous driving, the autonomous vehicle may perform erratic and highly dangerous maneuvers to attempt to correct positioning.

Figure 4B:
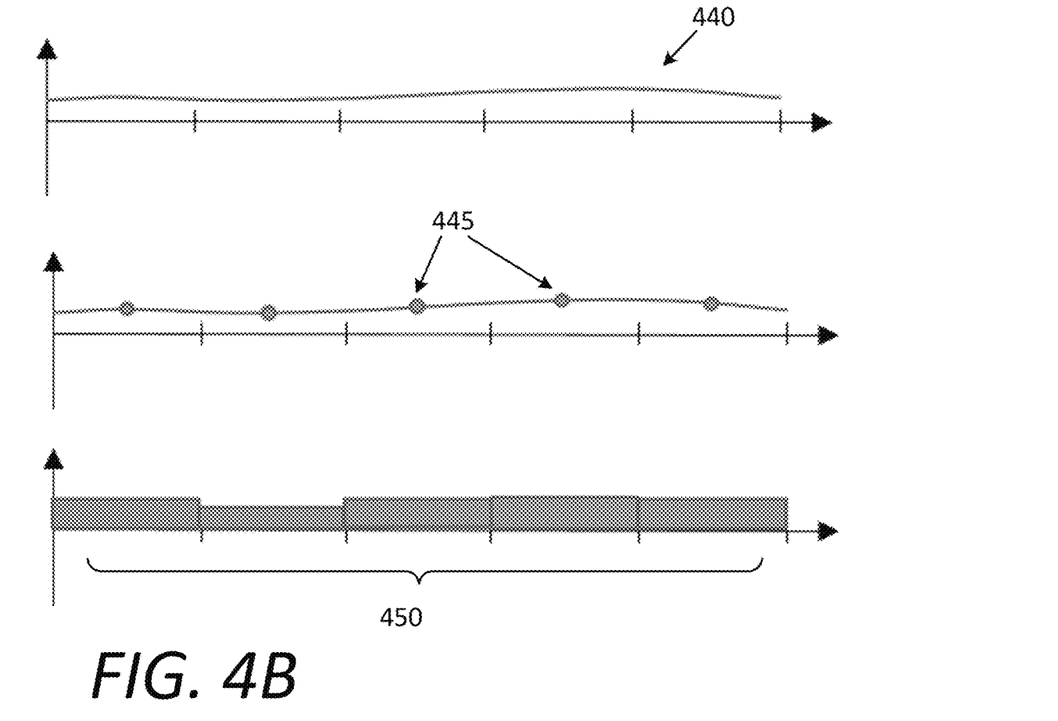
FIG. 4B illustrates example results of a sample-based estimator sampling sensor data with introduced uncertainty, according to examples described herein.

FIG. 4B illustrates example results of a sample-based estimator sampling sensor data with introduced measurement uncertainty, according to examples described herein. In the example shown in FIG. 4B, the probability distribution dilation is arbitrarily introduced without calculating a minimum measurement uncertainty value. Thus, the continuous localization pose estimate probability distribution 440 is dilated, or spread out. The sample-based estimator's likelihood samples 445 can again correspond to the center of each bin, which yields a more accurate correlation to the actual sensor data than the sampling method shown with respect to FIG. 4A. However, the resultant sampled state estimate likelihoods 450 for each bin show that useful information has been purposefully discarded due to the introduction or measurement uncertainty, which, for autonomous vehicle applications, can result in inaccurate localization and pose estimates.

Figure 4C:
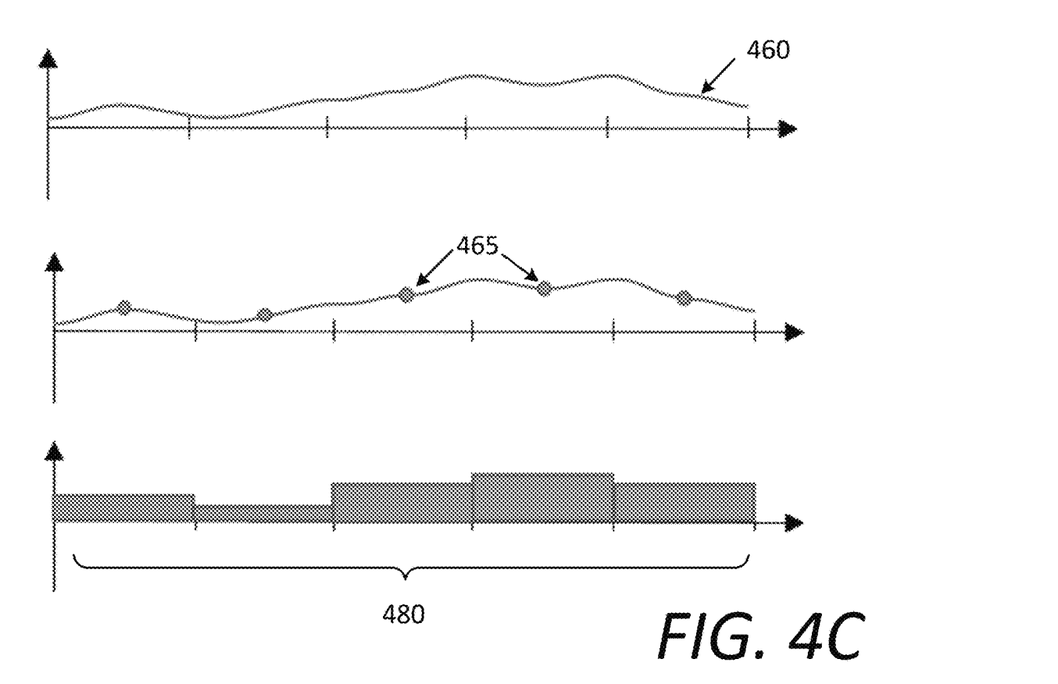
FIG. 4C illustrates example results of a sample-based estimator sampling sensor data with introduced uncertainty in accordance with an optimized minimum measurement uncertainty value, according to examples described herein.

FIG. 4C illustrates example results of a sample-based estimator sampling sensor data with introduced measurement uncertainty in accordance with an optimized minimum measurement uncertainty value, according to examples described herein. In the example shown in FIG. 4C, the probability distribution dilation has been optimized based on a calculated minimum measurement uncertainty value such that both the discarded information in the sensor date and the effects of aliasing are minimized. As a result, the continuous localization pose estimate probability distribution 460 is optimally dilated such that the likelihood samples 465 at the pose hypothesis in the center of each bin more accurately capture what is actually existent in the sensor data. As such, the sampled state estimate likelihoods 480 corresponding to the sample-based estimator bins more accurately represent the actual sensor data while minimizing aliasing and avoiding less optimal solutions, such as decreasing the sampling interval and bin width.

Methodology

In the below discussion of the methods of FIGS. 5 and 6, reference may be made to reference characters representing certain features described with respect to the systems diagrams of FIGS. 1, 2, and 3. Furthermore, the steps described with respect to the flow charts of FIGS. 5 and 6 may be performed by the computing systems 100, 200 or the vehicle control system 300 as shown and described with respect to FIGS. 1, 2, and 3. Further still, certain steps described with respect to the flow charts of FIGS. 5 and 6 may be performed prior to, in conjunction with, or subsequent to any other step, and need not be performed in the respective sequences shown.

Figure 5:
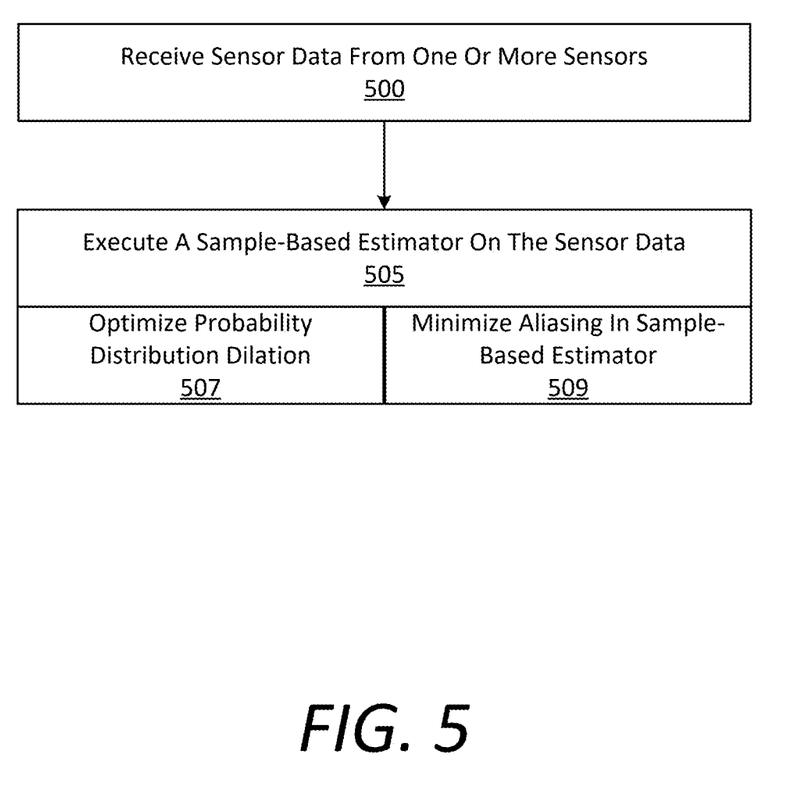
FIG. 5 is a flow chart describing a method of minimizing aliasing in sample-based estimators, according to examples described herein.

FIG. 5 is a flow chart describing a method of minimizing aliasing in sample-based estimators, according to examples described herein. The method described in accordance with FIG. 5 may be performed by any computer or computing system that processed sensor data with a sample-based estimator, such as a histogram filter or particle filter. For example, the computing system 200 shown and described in connection with FIG. 2 may implement the processed described with respect to FIG. 5. Referring to FIG. 5, at block 500, the system 200 can receive sensor data from one or more sensors. As described herein, the sensor data can comprise image data from one or more image sensors, LIDAR data comprising a three-dimensional point cloud map, radar data, infrared data, or any combination of the foregoing.

In various implementations, at block 505, the system 200 can execute a sample-based estimator 210 on the sensor data. As described herein, at block 507, the sample-based estimator 210 can optimize a probability distribution dilation of the sensor data based on a calculated minimum measurement uncertainty value. As further described herein, the minimum measure state uncertainty value can be calculated based on an application of the Nyquist-Shannon sampling theorem to sample-based estimators. At block 509, execution of the sample-based estimator 210 on the sensor data can effectively minimize aliasing in the sample-based estimator.

Figure 6:
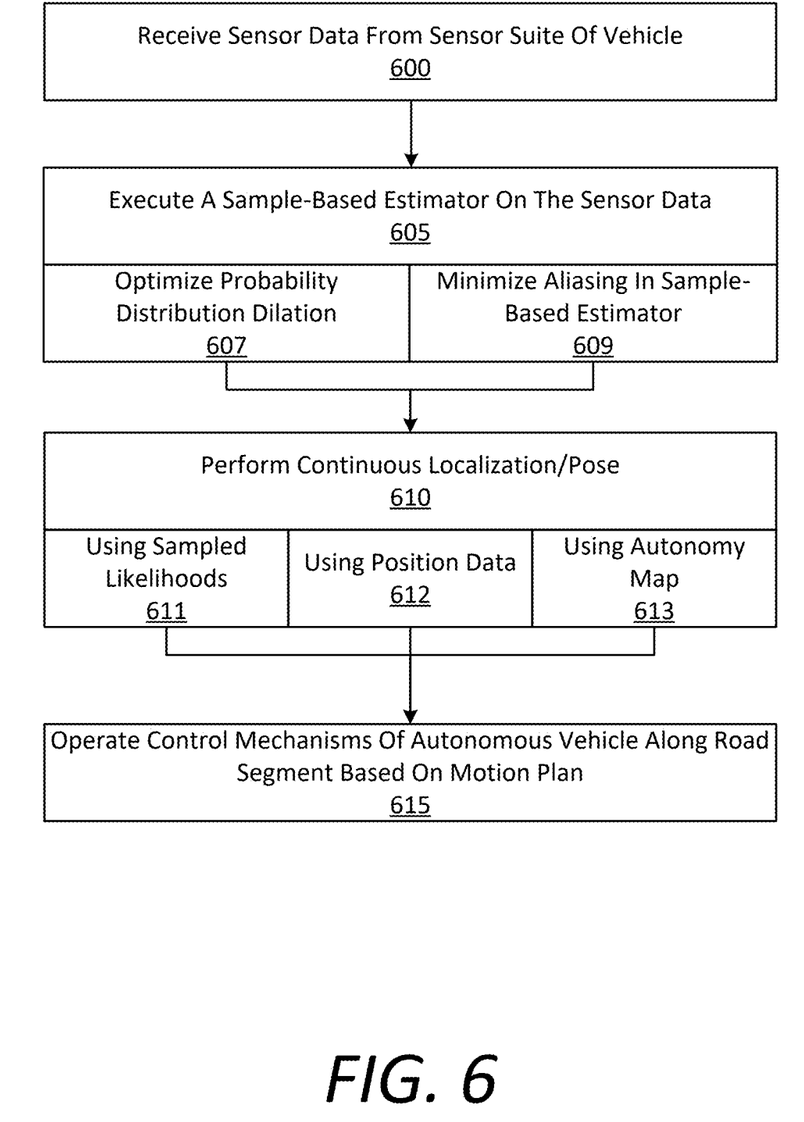
FIG. 6 is a flow chart describing a method of implementing a sample-based estimator for minimizing aliasing in an autonomous vehicle, according to examples described herein.

FIG. 6 is a flow chart describing a method of implementing a sample-based estimator for minimizing aliasing in an autonomous vehicle, according to examples described herein. In various examples, the method described in connection with FIG. 6 may be performed by an example vehicle control system 300, or localization module 310 disposed within the vehicle control system 300. At block 600, the system 300 can receive sensor data from a sensor suite 305 of the vehicle. As described herein, the sensor data can comprise image data from one or more image sensors, LIDAR data comprising a three-dimensional point cloud map, radar data, infrared data, or any combination of the foregoing. At block 605, the system 300 can execute a sample-based estimator 312 (e.g., a histogram or particle filter) on the sensor data, which, at block 607, can optimize the probability distribution dilation of the sensor data, and thus, at block 609, minimize aliasing in the sample-based estimator 312.

At block 610, the system 300 can perform continuous localization and pose operations. In accordance with example described herein, the system 300 can do so through utilization of the sampled pose estimate likelihoods as determined from the optimized probability distribution of the sensor data, and as dilated using the calculated minimum measurement uncertainty value, at block 611. The system 300 can further perform the localization and pose operations using position data from a positioning system 330 of the vehicle, at block 612. As described herein, the positioning system 330 can comprise a GPS module or other GNSS module. In further examples, the system 300 can further perform the localization and pose operations using information included in an autonomy map 352, at block 613. As provided herein, the autonomy map can comprise one or more layers of labeled data that indicate the specified traffic rules (e.g., speed limits, signage, yield zones, crosswalk information, traffic signals, etc.) for any given road segment and/or intersection.

As further provided herein, the minimum measurement uncertainty value to minimize aliasing in the sample-based estimator 312 can determined based on an application of the Nyquist-Shannon sampling theorem to the sample-based estimator 312. In certain examples, the minimum measurement uncertainty value can comprise a minimum measurement uncertainty limit that is calculated based on the application of the Nyquist-Shannon sampling theorem to the sample-based estimator 312. In further examples, execution of the sample-based estimator 312 based on the minimum measurement uncertainty value causes dilated measurement probability distributions to propagate to dilated state estimate probability distributions that are minimally susceptible to corrupting effects of aliasing.

In various implementations, the sensor data can correspond to a sensor view of a surrounding environment of the vehicle. At block 615, the system 300 can autonomously operate the set of control mechanisms 325 of the vehicle to drive the vehicle along a road segment based at least in part on a state estimate from the sample-based estimator 312. As described herein, the set of control mechanisms can comprise at least a steering system, a braking system, and an acceleration system of the vehicle.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature.

What is claimed is:

1. A computing system of an autonomous vehicle, the computing system comprising:
   one or more processors;
   a memory storing instructions that, when executed by the one or more processors, cause the computing system to:
   receive sensor data from one or more sensors of the autonomous vehicle, the sensor data corresponding to a real-time sensor view of a surrounding environment of the autonomous vehicle;
   dynamically execute a sample-based estimator applying the Nyquist-Shannon sampling theorem on the sensor data to dynamically generate a state estimate, the sample-based estimator optimizing a probability distribution dilation of the sensor data based on a minimum measurement uncertainty value to minimize aliasing in the sample-based estimator; and
   autonomously operate a set of control mechanisms of the autonomous vehicle to drive the autonomous vehicle along a road segment based, at least in part, on the dynamically generated state estimate from the sample-based estimator.

2. The computing system of claim 1, wherein the minimum measurement uncertainty value comprises a minimum measurement uncertainty limit that is calculated based on the application of the Nyquist-Shannon sampling theorem to the sample-based estimator.

3. The computing system of claim 1, wherein the sample-based estimator comprises one of a histogram filter or a particle filter.

4. The computing system of claim 1, wherein execution of the sample-based estimator based on the minimum measurement uncertainty value causes dilated measurement probability distributions to propagate to dilated state estimate probability distributions that are minimally susceptible to corrupting effects of aliasing.

5. The computing system of claim 1, wherein the set of control mechanisms comprises a steering system, a braking system, and an acceleration system of the autonomous vehicle.

6. A non-transitory computer readable medium storing instructions that, when executed by one or more processors of a computing system of an autonomous vehicle, cause the computing system to:
   receive sensor data from one or more sensors of the autonomous vehicle, the sensor data corresponding to a real-time sensor view of a surrounding environment of the autonomous vehicle;
   dynamically execute a sample-based estimator applying the Nyquist-Shannon sampling theorem on the sensor data, the sample-based estimator optimizing a probability distribution dilation of the sensor data based on a minimum measurement uncertainty value to minimize aliasing in the sample-based estimator; and
   autonomously operate a set of control mechanisms of the autonomous vehicle to drive the autonomous vehicle along a road segment based on a state estimate from the sample-based estimator.

7. The non-transitory computer readable medium of claim 6, wherein the minimum measurement uncertainty value comprises a minimum measurement uncertainty limit that is calculated based on the application of the Nyquist-Shannon sampling theorem to the sample-based estimator.

8. The non-transitory computer readable medium of claim 6, wherein the sample-based estimator comprises one of a histogram filter or a particle filter.

9. The non-transitory computer readable medium of claim 6, wherein execution of the sample-based estimator based on the minimum measurement uncertainty value causes dilated measurement probability distributions to propagate to dilated state estimate probability distributions that are minimally susceptible to corrupting effects of aliasing.

10. The non-transitory computer readable medium of claim 6, wherein the set of control mechanisms comprises a steering system, a braking system, and an acceleration system of the autonomous vehicle.

11. A computer-implemented method of processing sensor data, the method being performed by one or more processors of a computing system of an autonomous vehicle and comprising:
    receiving sensor data from one or more sensors of the autonomous vehicle, the sensor data corresponding to a real-time sensor view of a surrounding environment of the autonomous vehicle;
    dynamically executing a sample-based estimator applying the Nyquist-Shannon sampling theorem on the sensor data, the sample-based estimator optimizing a probability distribution dilation of the sensor data based on a minimum measurement uncertainty value to minimize aliasing in the sample-based estimator; and autonomously operating a set of control mechanisms of the autonomous vehicle to drive the autonomous vehicle along a road segment based on a state estimate from the sample-based estimator.

12. The method of claim 11, wherein the minimum measurement uncertainty value comprises a minimum measurement uncertainty limit that is calculated based on the application of the Nyquist-Shannon sampling theorem to the sample-based estimator.

13. The method of claim 11, wherein the sample-based estimator comprises one of a histogram filter or a particle filter.

14. The method of claim 11, wherein execution of the sample-based estimator based on the minimum measurement uncertainty value causes dilated measurement probability distributions to propagate to dilated state estimate probability distributions that are minimally susceptible to corrupting effects of aliasing.

15. The method of claim 11, wherein the set of control mechanisms comprises a steering system, a braking system, and an acceleration system of the autonomous vehicle.

* * * * *